United States Patent [19]

Garfunkel

[11] 3,860,344

[45] Jan. 14, 1975

[54] MULTI-COMPONENT INFRARED ANALYZER

[75] Inventor: James H. Garfunkel, Mound, Minn.

[73] Assignee: Honeywell Inc., Minneapolis, Minn.

[22] Filed: May 10, 1973

[21] Appl. No.: 359,163

[52] U.S. Cl.............. 356/51, 250/339, 250/345, 250/350, 356/188, 356/189
[51] Int. Cl............... G01n 21/34, G01j 3/48
[58] Field of Search ...... 356/188, 189, 51; 250/339, 250/343, 344, 345, 349, 350, 351, 578

[56] References Cited
UNITED STATES PATENTS

| | | | |
|---|---|---|---|
| 2,666,854 | 1/1954 | Hutchins | 250/343 |
| 3,250,174 | 5/1966 | Lutz | 250/351 |
| 3,405,268 | 10/1968 | Brunton | 356/51 |
| 3,498,132 | 3/1970 | Smith et al. | 250/343 |
| 3,580,679 | 5/1971 | Perkin | 356/76 |
| 3,588,496 | 6/1971 | Snowman | 250/343 |
| 3,678,262 | 7/1972 | Herrmann | 350/343 |
| 3,696,247 | 10/1972 | McIntosh et al. | 356/51 |

Primary Examiner—Vincent P. McGraw
Attorney, Agent, or Firm—Charles G. Mersereau; Henry L. Hanson

[57] ABSTRACT

An improved multi-component non-dispersive infrared analyzer for selectively analyzing for a plurality of gases of interest in a gaseous mixture utilizes a simplified optical system having an independent narrow bandpass filter, independent detector means and independent synchronized signal processing means for each gas of interest for which the sample is to be analyzed which reduces crosstalk in the electronic system and allows a more refined analysis.

14 Claims, 6 Drawing Figures

3,860,344

PATENTED JAN 14 1975　　3,860,344

MULTI-COMPONENT INFRARED ANALYZER

CROSS-REFERENCE TO RELATED APPLICATIONS

Reference is made to a co-pending application by Donald E. Benz; James H. Garfunkel (the inventor in this application), and Arlon D. Kompelien, Ser. No. 359,144, filed of even date, and assigned to the same assignee. The specification is deemed incorporated by reference herein. That application is also concerned with a multi-component non-dispersive infrared analyzer. By that invention a plurality of pairs of filters, each pair comprising a reference and an analysis filter for a given gas of interest, are disposed sequentially for a periodic time duration in an infrared radiation path including a source, sample cell and detector. A single detector is used which sequentially detects the infrared radiation transmitted during each successive time duration. A special synchronization system and multiplexing signal analysis system are required to sort out the detector signals and provide an output for a plurality of gases of interest in a single instrument.

By the present invention, a separate detector paired with a separate signal processing system is provided for the analysis for each gas of interest. The infrared energy is received simultaneously at all the detectors through an array of narrow bandpass optical filters each of which is paired with a detector and each of which passes a narrow passband of the infrared spectrum containing at least one strong absorption line of a particular gas of interest. Because each bandpass filter is associated with a specific detector which together with an associated signal processing system form a system for the detection of a specific gas of interest and because the transmitted infrared energy passes all systems substantially simultaneously, a single reference filter and single analysis filter may be used. The use of a separate signal processing system associated with each detector eliminates the requirements of complicated multiplexing electronics to sort out signals associated with the detection of different gases of interest.

BACKGROUND OF THE INVENTION

1. Field of the Invention

The present invention relates generally to nondispersive infrared analyzers and, more particularly, to an improved multi-component analyzer having a plurality of detectors and signal processing systems.

2. Description of the Prior Art

It has long been known that certain heteroatomic gases have individual characteristic absorption spectra and that such gases absorb infrared energy in an amount proportional to the number of molecules of that gas present in a gaseous mixture. This knowledge has led to the subsequent development of analytical instruments which apply these principles to the quantitative analysis of mixtures of such gases.

In one type of such analyzer a dual path system is used in which the intensity of the infrared radiation traversing a reference path is compared with that traversing a sensitized or analysis path in a manner which renders a difference between the energy absorbed from each of the two paths dependent only upon the amount of a specific gas designated as the "gas of interest" to be determined in the sample. Normally, the reference system includes a cell containing a gas which does not absorb infrared radiation, for example, nitrogen, the sample cell containing a sample of the gas to be analyzed, and a detector responsive to the intensity of infrared radiation impinging thereon. A sensitized or analysis system includes a sensitizing cell which contains a particular gas of interest, the sample cell and a detector.

In addition, other filters can be utilized in both the reference and analysis systems to enhance the specificity of the analyzer as by eliminating the interference caused by gases which have infrared spectra overlapping that of the gas of interest. This is accomplished by disposing an additional filter cell in both the analysis and reference systems which is filled with that overlapping gas causing the overlapping spectrum to be absorbed from both systems equally. This can also be accomplished by filtering out a part of the infrared spectrum in which such interfering gases strongly absorb using optical filters.

In the prior art several attempts have been made to adapt a dual-path analyzer of the general type described to analyze for a plurality of gases of interest. A patent to Hutchins U.S. Pat. No. 2,720,594 issued Oct. 11, 1955, describes a dualbeam system employing mechanically synchronized rotating filter wheels adapted to align sensitizing cells and a reference cell simultaneously in series with a sample cell for the analysis of each gas of interest. In that system both the reference and analysis paths must be lined up with the detector long enough for the system to reach an equilibrium in order for a reliable quantitative determination of each gas of interest to be obtained. The resulting machine is relatively slow and cumbersome and is quite sensitive to changes in detector absorption characteristics, interfering gases and is incapable of any simultaneous reading of the plurality of gase of interest as a separate equilibrium must be reached sequentially for each.

A similar dual-path system is found in a patent to Munday U.S. Pat. No. 2,741,703, issued Apr. 10, 1956. That patent describes a system employing two radiation sources and a differential detector and, in addition to having the drawbacks of the Hutchins analyzer this analyzer, by using two separate sources, has an additional possible source of air to the system. Thus, if one of the sources changes in intensity it effects only the infrared energy traversing a single path and may cause an erroneous difference in the intensity of the infrared radiation when the two paths are compared by the detector system.

Further prior art references contained in Japanese Utility Model Publication No. 4398/1969 published Feb. 18, 1969 entitled "Multi-Composition Infrared Analyzer". That disclosure describes a multi-component infrared gas analyzer which utilizes a single constant wavelength to provide a reference signal for all the gases of interest for which a sample is to be analyzed. This constant reference signal is compared with signals produced by the absorption from different narrow-bands associated with each gas of interest for which the sample is to be analyzed. That system utilizes mechanical contact points similar to those in an automotive distributor to provide synchronization between the detector signals and the proper amplifying and output device. Because a constant single wavelength reference system is used which has a different wavelength from that used to analyze for each of the gases of interest in the sample, any of the possible changes in the source or detector output, etc. which affect different wavelengths in a different manner affect the reference signal differently from the analysis signal thereby producing unwanted detection errors.

SUMMARY OF THE INVENTION

According to the present invention there is provided an improved multi-component, non-dispersive infrared analyzer which oversomes problems associated with previous multi-component analyzers. This is accomplished through a unique combination including optical filters, detectors and signal processing systems to allow an accurate, simultaneous quantitative determination of the presence of a plurality of gases of interest in a gaseous mixture. The analyzer of the invention employs an individual detector and signal processing system for the determination of each of gas of interest.

The present invention is basically an improved non-dispersive infrared correlation spectrometer which utilizes, in the preferred embodiment, a single radiation path containing a source of infrared radiation, a sample cell, reference and analysis filter systems, and a separate narrow bandpass filter, detector and detector signal processing system associated with each gas of interest for which the sample is to be analyzed. The reference filter normally contains a filter element which is transparent to infrared radiation and the analysis filter contains a filter cell element containing amounts of all of the gases of interest for which the sample is to be analyzed. An independent narrow bandpass filter is provided for the analysis for a corresponding gas of interest which has a passband centered on a portion of the infrared spectrum in which that particular gas of interest has at least one strong absorption line. Associated with each narrow passband optical filter element is an independent detector which is disposed to receive only such infrared energy as passes through the associated bandpass filter. Each detector is, in turn, connected to a separate electronic signal processing system which converts the detector output into a useable output indication associated with the quantity of the particular gas of interest present in the sample. If required, an additional filter cell may be aligned with each narrow bandpass optical filter to contain one or more gases which might be present in the sample and which have an infrared absorption spectrum overlapping that of the particular gas of interest in the passband of the bandpass filter. This eliminates the overlapping gases from being mistaken for the gas of interest by the detector.

A mechanical device is provided to dispose the reference and analysis filters between the source and the plurality of detectors in line with the sample cell in periodic repetition. This is normally accomplished by mounting the reference and analysis filters in a rotatable filter wheel. A synchronization system is provided to insure proper synchronization between the rotation of the filter wheel and the signal processing systems. Thus, each rotation of the filter wheel produces a final output related to the difference between the infrared energy traversing the reference and analysis paths simultaneously for all gases of interest for which the sample is to be analyzed. This allows both simultaneous measurement and simultaneous quantitative readout of each gas of interest analyzing the system which can be utilized in any desired manner as by providing a reading on a conventional output meter.

Detectors used are ones exhibiting a rapid response and an excellent signal-to-noise ratio, such as solid state mercury cadmium telluride detectors which allow the filter wheel to be rotated at a relatively high rate of speed. The use of a separate detector for the analysis for each gas of interest allows selection of individual detectors to have a peak response at or near the passband of the associated bandpass filter.

DESCRIPTION OF THE PREFERRED EMBODIMENT

Figure 1:
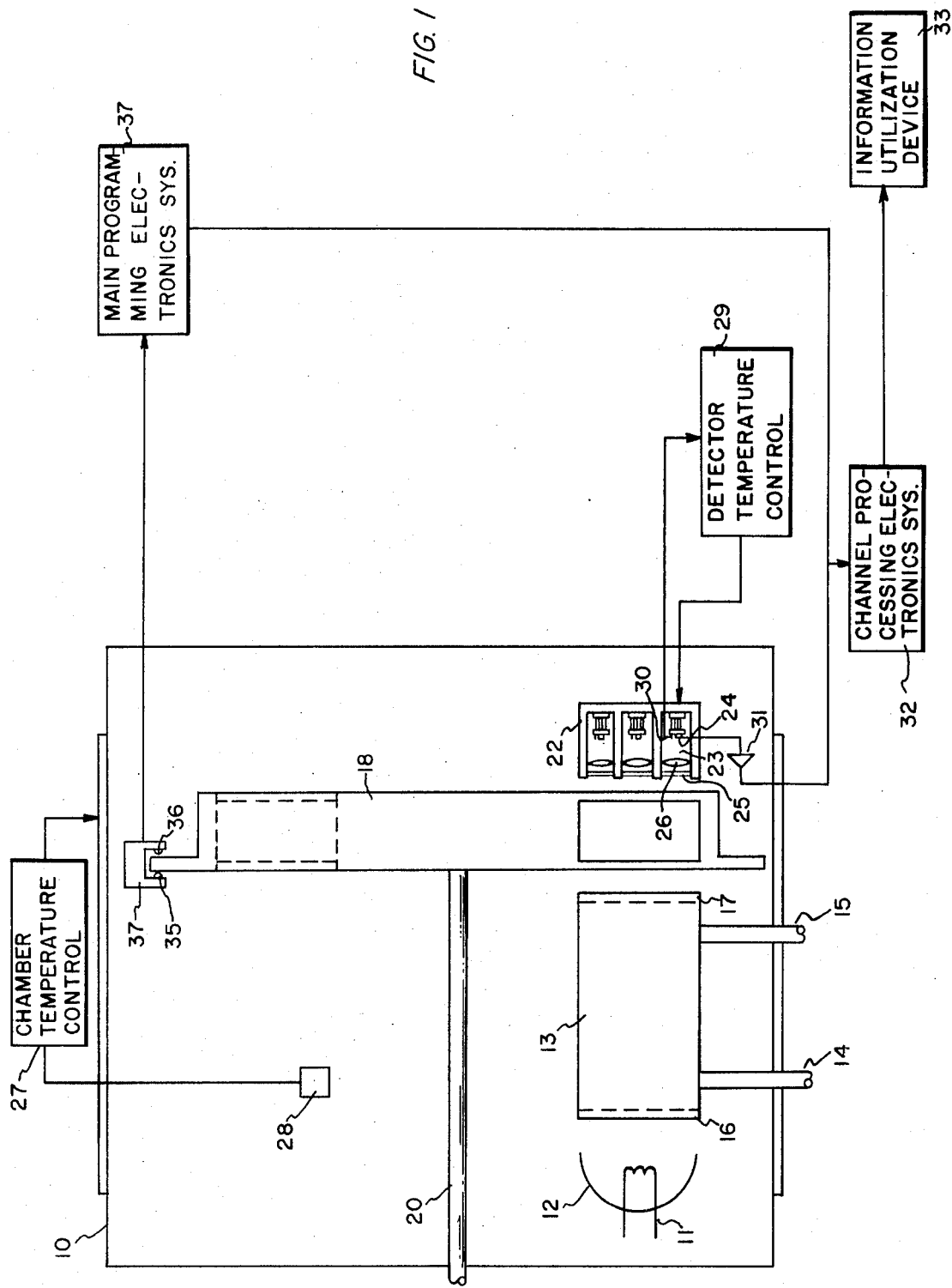
FIG. 1 is a schematic representation of the analyzing instrument of the present invention.

FIG. 1 shows a schematic representation of an embodiment of the analyzer of the present invention. A housing 10 is provided which normally contains the entire instrument with the exception of some of the electronic components of the analyzer. The analyzer includes a source of infrared energy 11 which, depending on its nature, may require an associated reflector 12. Sample cell 13 having access ports 14 and 15 and windows 16 and 17 which are transparent to infrared radiation is provided to contain the sample of the gas to be analyzed. The sample cell may be operated on either a batchwise or continuous sampling basis. A rotatable filter wheel 18 is provided containing a pair of filtering means required for the reference and analysis filtering in the determination of the gases of interest. The filter wheel components are discussed in greater detail below. The filter wheel is driven in conjunction with the operation of the analyzer as by an AC motor (not shown) connected by a driveshaft 20.

An important aspect of the present invention is the provision of a separate infrared detector for detecting the infrared radiation associated in the analysis of each gas of interest. Paired with each infrared detector is a separate narrow bandpass optical filter selected to have a passband in the infrared spectrum associated with at least one strong absorption line of the particular gas of interest sought by the analysis. There is shown, at 22, the detector chamber which may have a plurality of internal compartments each compartment containing a single detector and a certain associated component. Thus, for example, one of such chambers 23 contains an infrared detector 24 for detecting the infrared energy transmitted through an associated narrow bandpass optical filter 25 which is one selected to have a passband in the infrared spectrum containing at least one strong absorption line of a corresponding particular gas of interest for which the sample is to be analyzed. A lens 26 may be provided to focus the transmitted infrared radiation so that it will impinge on the detector 24. Components housed in the detector chamber 22 are shown in greater detail in the enlarged FIGS. 4 and 5 discussed below.

If desired, a chamber temperature control 27 may be used in conjunction with a temperature sensor 28 to control the ambient temperature within the analyzer chamber 10. This may be accomplished by actuating an auxiliary heating or cooling means in a well known manner. While a rigid temperature control system is not strictly required in the operation of the analyzer of the invention, it is desirable to be able to maintain a fairly constant temperature environment in the analyzer chamber. Temperature control is also desirable as it provides an analyzer which has the capability of performing well in a variety of external ambient temperature environments to make the instrument applicable to a wider range of such situations.

In addition to the chamber temperature control 27 additional temperature controls may be provided for each of the detectors. Such a detector temperature control 29 having a temperature sensor 30 is illustrated specifically in regard to the detector 24 in FIG. 1, although such systems if used would be provided for all such detectors in the analyzer system. As was the case with the chamber temperature control 27, the detector temperature control 29 is not strictly required for all applications of the instrument. However, the detector of the preferred embodiment is a solid state device and, as with most other solid state detectors, the detector of the preferred embodiment of the invention produces signals in response to the detection of infrared energy which are somewhat temperature dependent. With the solid state mercury cadmium telluride detectors of the preferred embodiment of the invention, discussed in greater detail below, a given intensity of intensity of infrared radiation impinging thereon produces an output which increases as the temperature of the detector is lowered. For example, at constant intensity the output of the detector may double in amplitude when the detector is cooled from approximately 25°C to 0°C assuming that other system variables remain unchanged. In most applications, however, the output obtained at 25°C has been found to be sufficient to produce good analytic results with the instrument of the invention. Temperature control 29 may consist of any conventional heat dissipating device applicable to the system and should require no detailed explanation to one skilled in the art. As illustrated temperature sensor 29 may be attached to the detector itself if more accuracy in temperature control is required for a particular application.

As more fully described in the co-pending application Ser. No. 359144, the source of infrared energy 11 should be one capable of delivering approximately 1 milliwatt of infrared energy to the detectors after accounting for intermediate system losses including absorption and other dissipations. The energy requirement may be met with various combinations of sources 11 with reflectors 12, as required. Generally, the more energy that is available at the source, the less stringent are the requirements for the reflector 12.

In general, the sample cell 13 should be one having a reasonably small volume, be gas tight, be void of dead spaces which might cause mixing or purging problems in the cell leading to erroneous analysis readings, easily cleaned and chemically inert to the constituents found in the sample. Windows 16 and 17 must be transparent to the infrared energy to be transmitted through the sample cell in the range in which the gases of interest absorb the infrared energy. Successful windows have been made out of sapphire, for example, which meets the above requirements very well. Infrared radiation transmittance through the sample cell 13 can be enhanced by coating the inside walls parallel to the transmittance path with a material having a high reflectivity for infrared radiation such as gold, for example. This technique has been found to be helpful in reducing source intensity requirements so that a wider variety of infrared sources may be used on the device.

Associated with each of the detectors in the analyzer of the invention, there is provided a separate detector output signal processing system. Because these systems are functionally identical for each detector, one such system can be described keeping in mind that a similar system exists for each detector in the instrument. The output signal from detector 24 is conducted to a detector amplifier system 31. The amplified signals are then fed to a channel processing electronics system 32 associated with the analysis of that particular gas of interest where the signal is further amplified and processed before being fed to an information utilization device 33 which may be a meter or other conventional output display or the input to a control or information storage device. The channel processing electronics system will be discussed in greater detail with relation to FIG. 6 below.

Synchronization between the channel processing electronic systems in relation to the position of the filter wheel 18 is also provided. The system shown at 34 may include light source such as a light emitting diode 35 in combination with an optically actuated switch 36 which may be a silicon detector switch. System 34 then feeds into a main programming electronic system 37 which provides the required synchronization for the channel processing electronics system 32.

Figure 2:
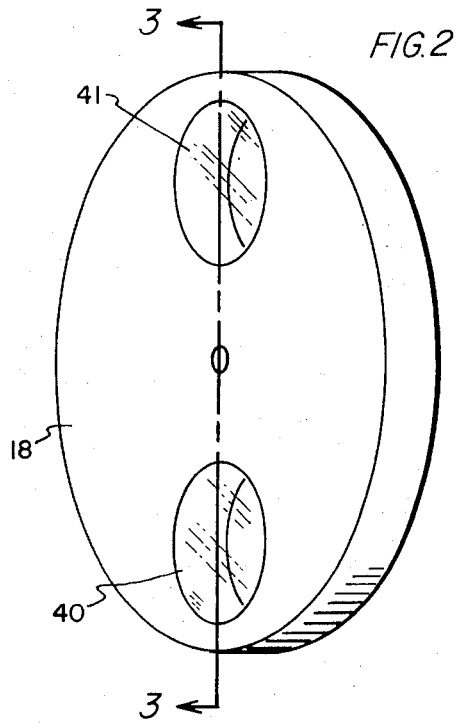
FIG. 2 is a perspective view of the filter wheel of the invention.
Figure 3:
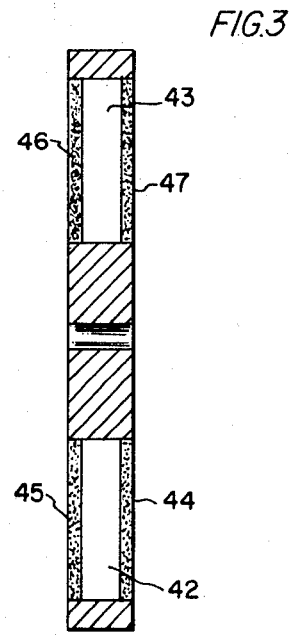
FIG. 3 is a sectional view taken substantially along line 3—3 of FIG. 2.

The filter wheel of the analyzer of the invention is shown in greater detail in FIGS. 2 and 3. FIG. 2 is an enlarged perspective view of the filter wheel of the preferred embodiment of the invention shown in FIG. 1. The filter wheel is typically in the form of a machined circular disk-shaped member provided with a pair of circular openings 40 and 41 extending therethrough. These openings are normally arranged in radial symmetry about the center of the dish-shaped filter wheel 18 so that as it rotates the openings 40 and 41 are alternately disposed in a predetermined path including the source 11, sample cell 13 and detector chamber 22.

In the corresponding sectional view taken through FIG. 2 shown in FIG. 3, it is seen that each of the openings 40 and 41 of filter wheel 18 contain filters which may have one or more filter elements. Thus, we may denote the filter associated with opening 40 FIG. 2 as the reference filter 42 in FIG. 3 and the filter associated with the opening 41 in FIG. 2 as analysis filter 43 in FIG. 3. Reference filter 42 normally is a filter cell which contains a gas transparent to infrared radiation such as nitrogen for example. The analysis filter 43 is a sensitizing cell which normally contains amounts of each of the gases of interest for which the sample is to be analyzed. To maintain the integrity of the contents in the filter cells, gastight infrared-transparent windows 44 through 47 are provided. A variety of materials can be used for these windows and success has been achieved utilizing sapphire windows secured in gastight fashion as by an epoxy resin. Access ports or valves, not shown, may be provided by machining in from the edge of the filter wheel 18 to provide an access to and a seal for the chambers 42 and 43 therein to insure the integrity of their contents.

Figure 4:
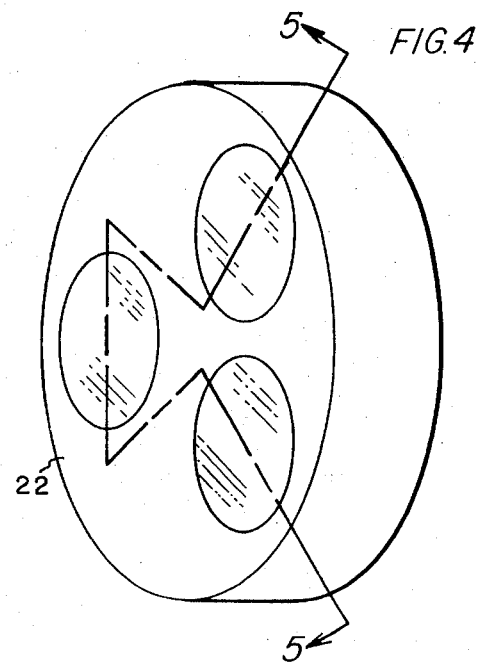
FIG. 4 is an enlarged end view of the detector chamber of FIG. 1.
Figure 5:
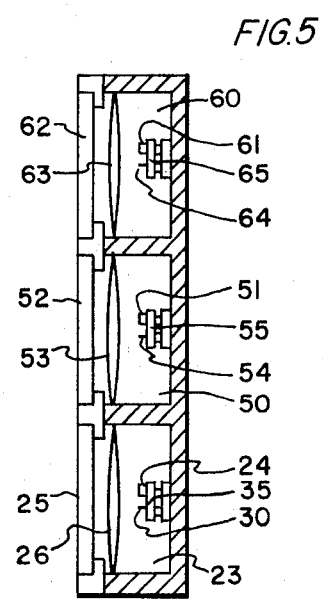
FIG. 5 is a sectional view taken substantially along line 5—5 of FIG. 4.

Details of detector chamber 22 are best seen in the enlarged views of FIGS. 4 and 5. The chamber 22 contains a plurality of separate internal compartments 23, 50 and 60. As explained above chamber 23 contains an infrared detector 24, narrow bandpass optical filter 25 and focusing lens 26 associated with the analysis of one gas of interest. Likewise chamber 50 contains detector 51, narrow bandpass filter 52 and focusing lens 53 and chamber 60 contains detector 61, narrow bandpass filter 62 and focusing lens 63. In addition to temperature sensor 30 in chamber 23, chambers 50 and 60 may contain similar temperature sensors 54 and 64, respectively, to control the temperatures in those chambers.

As explained above, each of the chambers 23, 50 and 60 contain components for the analysis of one of the plurality of gases of interest to be analyzed by the instrument of the invention. As stated above, in the analysis for each gas of interest, a particular bandpass filter is used having a passband in the infrared spectrum which includes at least in part a strong absorption line of the particular gas of interest for which the sample is to be analyzed by that system. Thus, the system of compartment 23 has an associated bandpass filter 25 having a passband associated with the analysis of a particular gas of interest which we may designate as gas A. In a like manner, the bandpass iflter 52 is associated with the analysis of a second gas of interest by the detector 51 in chamber 50 which we may designate as gas B and the bandpass filter 62 associated with the analysis of a third gas of interest by the detector 61 in chamber 60 which may be designated as gas C. The three bandpass filters 25, 52, and 62 normally have different passbands because each is associated with passing a band of infrared wavelengths associated with a different strong absorption line corresponding to a different gas of interest.

The detectors 24, 51 and 61 may be any one of a number of such devices which produce an intensity-related electrical signal in response to the detection of infrared energy. The solid state devices generally used are non-selective devices, i.e., devices the response of which is not limited to the spectrum of a particular absorbing component. While such detectors are normally sensitive to infrared radiation over a fairly broad range of the infrared spectrum, the peak sensitivity of such devices will vary somewhat with the exact chemical composition thereof. Another distinct advantage of providing an independent detector for the analysis of each gas of interest by the instrument of the present invention lies in the fact that the peak sensitivity of the detector selected for the analysis of each gas of interest may be selected to more closely correspond to that band of infrared wavelengths passed by the associated bandpass filter. This results in an ability to more closely tailor the associated analyzing system to each particular gas of interest for which the sample is to be analyzed thereby maximizing the sensitivity and selectivity of the device.

The response of the detector must be relatively rapid and the output produced must have a high signal-to-noise ratio in order for the analyzing instrument to provide a fast and accurate gas analysis. One material which has been found to meet all of the above requirements is the material mercury cadmium telluride (Hg,Cd)Te. Depending on their exact chemical composition, detectors made of this material can be tailored to have a peak infrared energy response over the entire range from about 1.0 to somewhere above 5.4 microns. This range thus encompasses the infrared spectrum required to analyze samples for most of the common heteroatomic gases normally sought by such devices. For example, strong absorption wavelengths include 3.3 microns for $CH_4$, 4.3 microns for $CO_2$ and 4.7 microns for CO. Within this range of wavelengths, however, as indicated above, by varying the composition of the detectors and by proper selection of individual detectors by testing same to determine individual peak absorption wavelengths, detectors can be selected for use in the instrument of the invention having particular peak sensitivities more closely associated with at least one strong absorption line with the corresponding gas of interest and selected passband filter. The response time to a step change in radiation input (which may be defined as the time it takes the detector output to build to about 63 percent of equilibrium value) of the (Hg,Cd)Te detector is relatively rapid (in the order of a few microseconds) and that detector exhibits a good signal-to-noise ratio.

As discussed above, each of the separate detectors may be cooled, if desired, to enhance the amplitude of a given response output. Thus, in response to separate temperature controls (one of which is illustrated at 29 in FIG. 1) which may be actuated by temperature sensors 30, 54 and 64 in a conventional type of heat exchange may be accomplished as by cooling the associated respective detector mounting bases 35, 55 and 65.

A general optical operation of the analyzer of the invention can best be seen by looking again at FIG. 1. As the filter wheel 18 rotates, infrared energy from the source 11, which continually traverses the sample cell 13, alternately traverses the filters 42 and 43 respectively contained in openings 40 and 41 in the filter wheel 18. The infrared radiation alternately transmitted through filters 42 and 43 is essentially simultaneously filtered by bandpass filters 25, 52 and 62 and focused by respective lenses 26, 53 and 63 which cause the corresponding radiation to impinge on detectors 24, 51 and 61.

In the analysis of gas A, for example, when the reference filter 42 is aligned in the system between the source and the detector compartment 22, infrared energy proceeds from the source to the sample cell where it is diminished in intensity by absorption due to any absorbing components which may be in the sample. The remaining infrared energy proceeds through the infrared-transparent reference filter 42 where no further infrared energy is absorbed to the array of narrow bandpass optical filters 25, 52 and 62. The infrared energy passband of bandpass filter 25 is associated with a strong absorption line of gas A and normally will not be coincident with an infrared absorption line of any other absorbing constituents in the sample. Therefore, the intensity of the infrared radiation passing through bandpass filter 25 and striking detector 24 will have been diminished while traversing the reference path, only by the absorption of infrared energy by the presence of the particular gas A in the sample cell and the blocking effect of the bandpass filter 25 and will produce a signal in relation to this resulting intensity.

As the filter wheel 18 rotates sequentially disposing analysis filter 43 in the path between the source and the detector chamber, radiation then proceeds from the source through the sample cell 13 and the analysis filter 43. The analysis filter 43 contains amounts of all the gases of interest for which the sample is to be analyzed. Thus, irrespective of the presence of gas A in the sample, the infrared spectrum associated with the gas A will be absorbed from the infrared radiation by the analysis filter 43. After proceeding through the bandpass filter 25 and lens 26 the infrared energy striking the detector like that infrared energy traversing the reference filter has an infrared spectrum consisting of the passband of the bandpass filter 25 except that the infrared absorption spectrum associated with the particular gas A is substantially removed therefrom.

The quantitative measurement of a gas of interest, in this case gas A, by the analyzer of the invention depends upon a comparison of the infrared intensity related output signal lobes produced by the detector sequentially detecting such light passing alternately through the reference filter 42 and the analysis filter 43. From the above, it can readily be seen that by a comparison of the effect of the reference and analysis filters on the infrared energy entering these filters, that the difference in final intensity is directly related to the absorption by the gas of interest in the sample cell from the infrared energy also traversing the reference cell. In similar fashion, detectors 51 and 61 detect differences in intensity caused by the absorption of infrared energy in the sample cell by gases B and C, respectively.

Subjecting the infrared radiation transmitted through both the reference and analysis filters to the same bandpass filter provides several advantages. Absorption of infrared energy by the gas of interest within the sample cell has a greater effecct on the total energy in the narrow passband presented to the detector than it would in a broader band of wavelength as the passband is centered where such gas strongly absorbs thereby enhancing the quantitative accuracy of the device. In addition, by causing the infrared energy producing both signals which are to be compared to pass through the same narrow passband, errors resulting from spectral shifts caused by such things as changes in source output or detector response are substantially eliminated as sources of error in the system.

As more fully explained in the above crossreferenced co-pending application Ser. No. 359,144, additional filters may be placed in line with the bandpass optical filter containing particular gases which have infrared spectra overlapping that of the particular gas of interest in the passband of the narrow bandpass optical filter should the possibility exist that such gases would be present in the sample. This eliminates interference caused by gases having partially correlated infrared fine absorption spectra within the passband of the narrow bandpass optical filter. Fine infrared absorption spectra may be defined as that band of fine absorption lines making up each strong absorption line in the broader infrared absorption spectrum of a gas. The chance of such fine infrared spectral correlation must be taken into account in the analysis of certain hydrocarbons. Proper selection of the passband may diminish this possibility.

As discussed above, the analysis of each gas of interest by the analyzer of the invention is derived from the alternately repeating detector output signal lobes due to infrared radiation transmitted through reference and analysis filters. Provision must be made for proper coordination between the position of the filter wheel 18 and the channel processing electronics system 32 to differentiate between the reference and analysis signals. To accomplish this, the light emitting diode 35 and optically actuated switch 36 may be operated in conjunction with a row of openings (not shown) spaced about the circumference of the outer edge of the filter wheel 18 to derive a synchronizing signal through the main programing electronics system 37 to synchronize the channel processing electronics system 32 with the rotation of filter wheel 18. That technique is more fully described in the co-pending application Ser. No. 359,144 and reference is made to that application for a complete discussion of a workable example of such a system.

Figure 6:
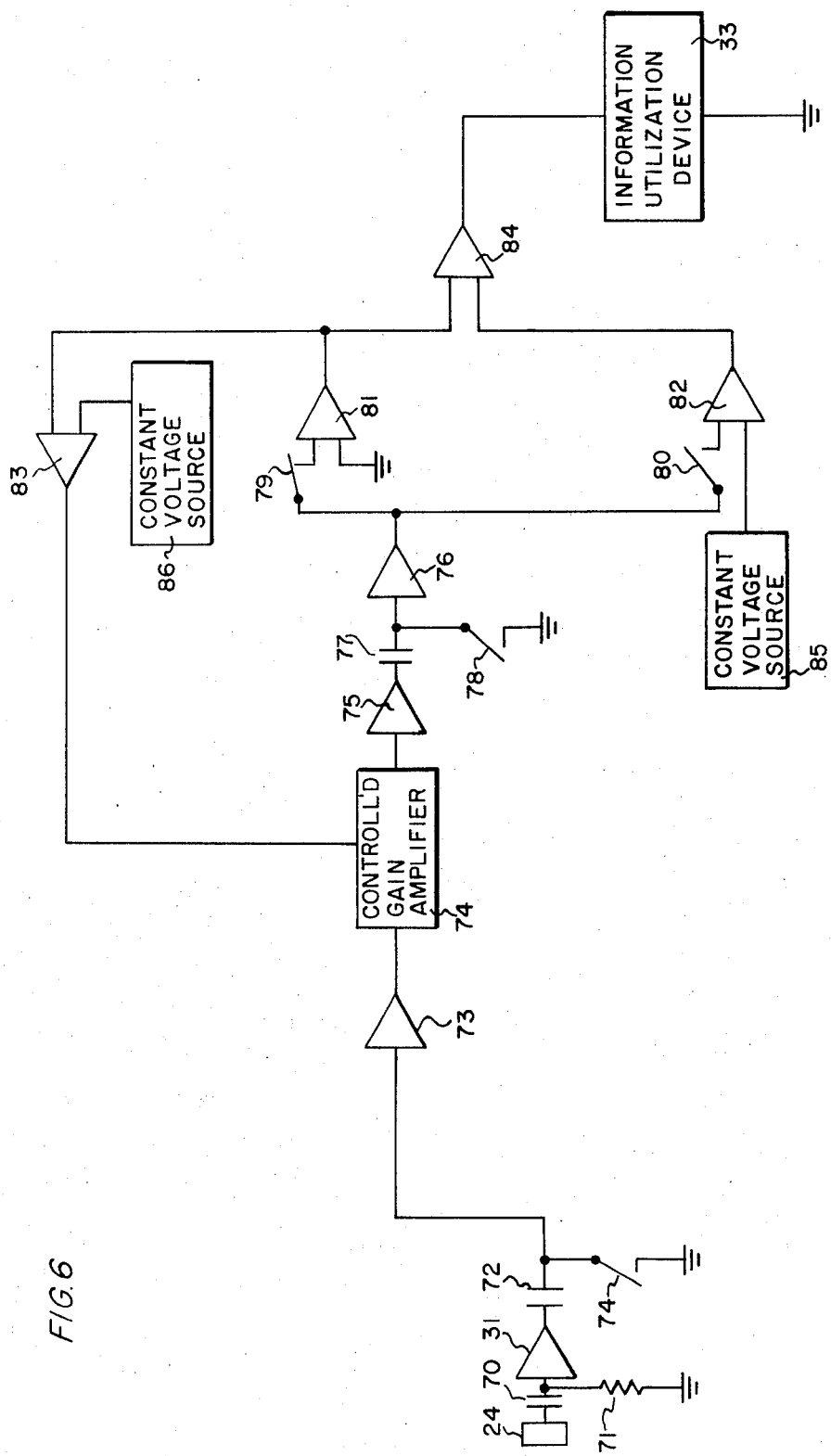
FIG. 6 is a schematic view of the signal processing channel electronics corresponding to the analysis of one gas of interest.

Turning now to FIG. 6, we see a more detailed schematic diagram of the channel processing electronics system 32. It should be kept in mind, of course, that one such system is provided in the analyzer of the invention for each separate detector employed although only one such system will be described herein. Utilizing the detector 24 of FIG. 1 as an example, the detector 24 is coupled by a capacitor 70, which may be grounded as through resistor 71, to an associated detector amplifier 31. The signals from the detector 24 after being filtered and amplified are capacitively coupled as by capacitor 72 to buffer amplifier 73. As coupling capacitor 72 is slightly charged by the voltage associated with each signal lobe produced by the detector 22 and amplifier 31, the accumulated charge due to each lobe must be discharged so that no residual charge thereon will be added to a successive signal lobe causing an error in this next signal lobe as transmitted. Clamping switch 74 is provided to discharge the coupling capacitor 72 to ground between successive signal lobes from detector amplifier 31. The detector amplifier 31 is one having a low output impedance so that the time between the amplified signals is sufficient to discharge the coupling capacitor 72 through the clamping switch 74 before a subsequent signal lobe begins.

The signal of buffer amplifier 73 is then fed into a controlled gain amplifier 74 and from there to a fixed gain amplifier 75 which is connected to a further buffer amplifier 76 by means of a coupling capacitor 77. The clamping switch 78 is provided to discharge coupling capacitor 77 between signal lobes in the same manner that clamping switch 74 discharges associated coupling capacitor 72.

Although a separate infrared detector and associated channel electronics system is provided for the analysis for each gas of interest in the analyzer of the invention, a demultiplexing system is required to separate the signal lobes associated with passage of infrared radiation through the reference filter 42 and the analysis filter 43 for each channel processing electronics system. As previously discussed, the analysis of each gas of interest depends ultimately upon a comparison of these successive signal lobes. Separation is accomplished by closing a transmitting switch 79 alternately with a transmitting switch 80. The transmitting switch 79 is closed during the time that a signal from detector 24, associated with the transmittance of infrared radiation through the analysis filter 43 occurs in the channel electronics system and the transmitting switch 80 is closed during the time the signal produced by detector 24 associated with the receiving of infrared radiation through the reference filter 42 occurs in the channel electronics processing system.

Associated with transmitting switches 79 and 80 are low pass amplifiers 81 and 82 respectively. A feedback loop is provided containing an integrating amplifier 83 which provides the control signal for the controlled-gain amplifier 74. The action of this feedback loop is such that the output signal of integrating amplifier 83 acts to control the gain of controlled-gain amplifier 74 in such a manner as to produce an output at output amplifier 84 proportional to a ratio of the signal lobes. This provides an output based on a true ratio comparison of the reference and analysis signal. Constant voltage sources 85 and 86 are applied to amplifiers 82 and 83 respectively. The output amplifier 84 provides the signal to be utilized by the information utilization device 33.

The schematic representation shown in FIG. 6 as discussed above illustrate one method of deriving a ratio output signal according to the respective detector output associated with the impinging radiation traversing a reference and analysis filters associated with quantitative determination of a particular gas of interest by the instrument of the invention. A more detailed, in depth, discussion of the operation of such a system is contained in the co-pending application, Ser. No. 359,144 which has been incorporated herein by reference.

The provision of a separate detector and associated channel processing electronics system for the analysis for each gas of interest in accordance with the present invention results in several distinct advantages. Electronic cross-talk associated with the demultiplexing of a plurality of signals from a single detector which are sequentially fed through a single channel processing electronics system may be greatly reduced by the provision of separate detectors and associated channel electronics processing systems. Also, the complex switching arrangement and complex associated synchronization system which would be associated with an analytical instrument having a single detector and single associated signal processing means for the determination of a plurality of gases, as can be seen from the above discussion, is simplified by the separate detector and separate channel processing electronics systems associated with the present invention.

The embodiments of the invention in which an exclusive property or right is claimed are defined as follows:

1. A multi-component gas analysis apparatus for a selective analysis for one or more gases of interest in a gaseous mixture wherein each of said gases of interest has a characteristic infrared absorption spectrum, said apparatus comprising:

a source of infrared radiation a first filtering means, aligned to receive said infrared radiation from said source during a first time duration, said first filtering means being a filter cell means containing amounts of each of said gases of interest to be detected, a second filtering means comprising independent bandpass optical filters, each of said bandpass optical filters corresponding to a different one of said gases of interest, said bandpass optical filters disposed such that each receives a portion of said infrared radiation from said source during said first time duration and during a second time duration, and wherein each of said bandpass optical filters has a narrow passband which contains at least in part a strong absorption line of said corresponding one of said gases of interest, independent detector means to produce an output signal in response to received infrared radiation passed through said first filtering means and an associated one of said bandpass optical filters during said first time duration and through said associated one of said bandpass optical filters during said second time duration, said detector means being capable of an output signal response to received radiation in less than either of said first or said second time durations, signal processing means to obtain from said output signal of each of said detectors an apparatus output indicating an analysis result as to the corresponding one of said gases of interest, and synchronization means for synchronizing operation of said signal processing means to said first and second time durations.

2. The apparatus of claim 1 further comprising sample cell means for containing a sample of said gaseous mixture.

3. The apparatus of claim 1 further comprising third filtering means having a third filter to receive said infrared radiation during said second time duration, said third filter being substantially transparent to infrared radiation.

4. The apparatus of claim 3 wherein said third filter is a closed chamber filled with a gas transparent to infrared radiation.

5. The apparatus of claim 4 wherein said gas transparent to infrared radiation is nitrogen.

6. The apparatus of claim 1 further comprising means alternately disposing said first and said third filtering means in a path between said source and said second filtering means.

7. The apparatus of claim 6 wherein said first and said third filtering means is secured to a driven rotating filter wheel which alternately disposes said filters in said predetermined path.

8. The apparatus of claim 1 wherein each of said detectors is a non-selective solid state detector.

9. The apparatus of claim 8 wherein each of said detectors has a peak infrared response wavelength which substantially corresponds to the passband of the associated one of said bandpass filters.

10. The apparatus of claim 8 wherein each of said detectors is a photoconductive detector.

11. The apparatus of claim 8 wherein each of said detectors is a mercury cadmium telluride detector.

12. The apparatus of claim 1 wherein said first filtering means contains an equal amount of each of said gases of interest to be detected.

13. The apparatus of claim 1 wherein said first filtering means comprises a plurality of filter cells, each of said filter cells containing an amount of a different one of said gases of interest to be detected.

14. The apparatus of claim 1 further comprising independent signal processing to obtain said apparatus output from said output signal of each of said detectors.

* * * * *